United States Patent [19]
Arold et al.

[11] Patent Number: 5,050,486
[45] Date of Patent: Sep. 24, 1991

[54] AIR-CONDITIONING SYSTEM FOR VEHICLES

[75] Inventors: Klaus Arold; Heinz Koukal; Gernot Karioth, all of Sindelfingen; Hans Trube, Herrenberg, all of Fed. Rep. of Germany

[73] Assignee: Mercedes-Benz AG, Fed. Rep. of Germany

[21] Appl. No.: 561,598

[22] Filed: Aug. 2, 1990

[30] Foreign Application Priority Data

Aug. 3, 1989 [DE] Fed. Rep. of Germany ....... 3925726

[51] Int. Cl.⁵ .............................................. B60H 1/00
[52] U.S. Cl. ................................. 98/2.08; 237/12.3 A
[58] Field of Search .................. 98/2, 2.05, 2.08, 2.11; 165/42, 43; 237/12.3 A, 12.3 B

[56] References Cited

U.S. PATENT DOCUMENTS 4,852,638  8/1989  Hildebrand et al. ................. 98/2.11
4,947,735  8/1990  Guillemin ........................ 98/2.08 X

FOREIGN PATENT DOCUMENTS 3300737  7/1984  Fed. Rep. of Germany .
3323176  1/1985  Fed. Rep. of Germany ....... 98/2.08
3542626  4/1987  Fed. Rep. of Germany ..... 237/12.3 A
2562845  10/1985  France ............................... 98/2.08
224809  12/1983  Japan .................................... 165/43

Primary Examiner—Harold Joyce
Attorney, Agent, or Firm—Evenson, Wands, Edwards, Lenahan & McKeown

[57] ABSTRACT

In an air-conditioning system for vehicles, with a blower, evaporator, heat exchanger and air distributor box with air-outflow ports for at least one middle nozzle and for side nozzles, the air distributor box is connected directly by means of its inlet cross-section to the evaporator. The heat exchanger is arranged aproximately centrally in the air distributor box so as to subdivide the latter into a front and a rear space portion. An air-guide connection piece extends from the front space portion which leads to the middle nozzle and which is connected to the front space portion via a cold-air scoop flap and is in communication with the rear space portion via two bypass channels, in each of which a temperature control flap is arranged. Air-outflow ports for the side nozzles are arranged in the bypass channels. Thus, in the "maximum cooling" mode, cold air passes directly from the front space portion of the air distributor box into the middle and side nozzles and improves the cooling of the passenger space.

15 Claims, 2 Drawing Sheets

AIR-CONDITIONING SYSTEM FOR VEHICLES

BACKGROUND AND SUMMARY OF THE INVENTION

The invention relates to an air-conditioning system for vehicles, of the generic type with a blower and an evaporator arranged downstream thereof and with a heat exchanger and an air distributor box which has air-outflow ports for at least one middle nozzle and for side nozzles and as appropriate for foot-space, back and deicer nozzles. The air distributor box is connected directly by means of its inlet cross-section to the evaporator and receives the heat exchanger approximately centrally in such a way that it is subdivided by the heat exchanger into a front space portion facing the evaporator and into a rear space portion located behind the heat exchanger. An air-guide connection piece branches off from the front space portion of an upper region of the air distributor box as seen from the evaporator, which connection piece carries the air-flow port for the middle nozzle at its end and of which at least one inflow port located in the air distributor box and extending over the entire evaporator width is selectively closeable by means of a cold-air scoop flap.

In a known air-conditioning system described in German Patent Document DE 3,542,626 A1, the heat exchanger is arranged at the entrance of the air distributor box. The air-outflow port for the deicer nozzle is provided in the upper region of the air distributor box, and air-outflow ports for side and foot-space nozzles are provided in the two lateral regions of the air distributor box. The air-outflow port for the middle nozzle is arranged at the end of a fresh-air channel divided into two separate branch lines which upstream are guided laterally past the heat exchanger on the left and right and which each terminate behind the evaporator in an air-inflow port. Downstream below the branch point, the fresh-air channel is connected to the air distributor box via a connecting port equipped with a mixer flap. A fresh-air regulating flap is arranged in each branch line. The desired temperature of the air flowing out at the middle nozzle can be set by adjusting the mixer flap and the fresh-air regulating flaps. A ventilation of the passenger space with fresh air, bypassing the heat exchanger, or a maximum cooling of the passenger space can be carried out only via the middle nozzle.

In a like wise known air-conditioning system of the type mentioned in the introduction and described in German Patent Document DE 3, 300,737 A1, the heat exchanger likewise arranged approximately centrally in the air distributor box covers the clear cross-section of the latter only partially and above the heat exchanger leaves free a bypass orifice which allows a direct flow of the cold air coming out of the evaporator into the rear space portion, bypassing the heat exchanger. The air fractions flowing through the heat exchanger and through the bypass orifice are adjusted by means of a regulating flap assigned to the bypass orifice. In the two extreme positions of the regulating flap, the bypass orifice and the heat exchanger are respectively covered completely, so that air flows solely through the heat exchanger (maximum heating mode) or solely through the bypass orifice (maximum cooling mode). The air fractions are mixed again in an air channel which connects the rear space portion to the middle nozzle and in which the foot-space and back nozzles are also arranged. The middle nozzle and foot-space and back nozzles are therefore always supplied with air at the same temperature. The cold-air scoop flap allows an additional direct feed of the middle nozzle with cold air, even in the heating mode, but with the exception of the "maximum heating" mode. It controls an air-through flow port which is arranged directly behind the bypass office and which connects the bypass orifice directly to the middle nozzle, bypassing the air channel extending from the rear space portion. By means of the cold-air scoop flap, in the middle nozzle cold air is mixed with the air stream of controlled temperature supplied to the middle nozzle via the air channel, thereby ensuring a better temperature stratification in the passenger space. A separate feed of the middle nozzle with cold-air only and of the back and foot-space nozzles with warm air only is not possible. For the "maximum cooling" mode, it is necessary to transfer the regulating flap into its end position covering the heat exchanger. Both the middle nozzle and the foot-space and back nozzles are then supplied with cold air. An additional opening of the cold-air scoop flap increases the fraction of cold air flowing to the middle nozzle.

An object on which the invention is based is to provide an air conditioning system of the type mentioned in the introduction, in which, without the need for a regulating flap for dividing the air stream into warm air and cold air, both the possibility of a separate supply of the middle nozzle with cold air or fresh air during the heating mode is afforded and, in the "maximum cooling" or "ventilation" mode, the supply of cold air or fresh air into the passenger space takes place via the middle nozzle and side nozzles, if appropriate also via the back and/or foot-space nozzles, for a more rapid cooling or ventilation of the passenger space.

In an air-conditioning system of the generic type indicated above, according to the invention the object is achieved by means of an arrangement wherein the heat exchanger completely covers the cross-section of the air distributor box, wherein there extends from the rear space portion of the air distributor box two bypass channels which are guided laterally around the heat exchanger and which terminate in the air-guide connection piece, wherein transition orifices of the bypass channels in the air-guide connection piece are selectively closeable by means of temperature control flaps, and wherein the air-outflow ports for the side nozzles are arranged in the two bypass channels.

With the installation according to the invention of the heat exchanger in the air distributor box, the design of the bypass channels leading past the heat exchanger from the rear space portion of the air distributor box to the air-guide connection piece above the cold-air scoop flap and the arrangement of the side nozzles in these bypass channels, in the heating mode the warm air is fed to the air-guide connection piece for the middle nozzle from the rear side of the heat exchanger via the bypass channels. Warm air passes both into the side nozzles and into the middle nozzle. By means of the temperature control flaps, an allocation of air quantity to the side nozzles and middle nozzle can be carried out. With the opening of the cold-air scoop flap, either cold air can be admixed for the middle nozzle (the temperature control flaps are open) or the middle nozzle is supplied only with cold air (the temperature control flaps are closed). In the "maximum cooling" or "ventilation" mode, the cold-air scoop flap is opened completely, with the temperature control flap open. The fresh or cold air flows out through the air-guide connection piece to the middle nozzle and, in the opposite direction to the warm air, through the bypass channels and comes out at the side nozzles. The air throughput is thereby increased and the desired cooler climate in the passenger space is obtained substantially more quickly.

If, according to one embodiment of the invention, the air-flow ports for the foot-space and back nozzles are likewise arranged in the lateral bypass channels and these are equipped with regulating flaps, then, if required, these nozzles too can be used for ventilating the passenger space in the "maximum cooling" and "ventilation" modes.

Other objects, advantages and novel features of the present invention will become apparent from the following detailed description of the invention when considered in conjunction with the accompanying drawings.

DETAILED DESCRIPTION OF THE DRAWING

Figure 1:
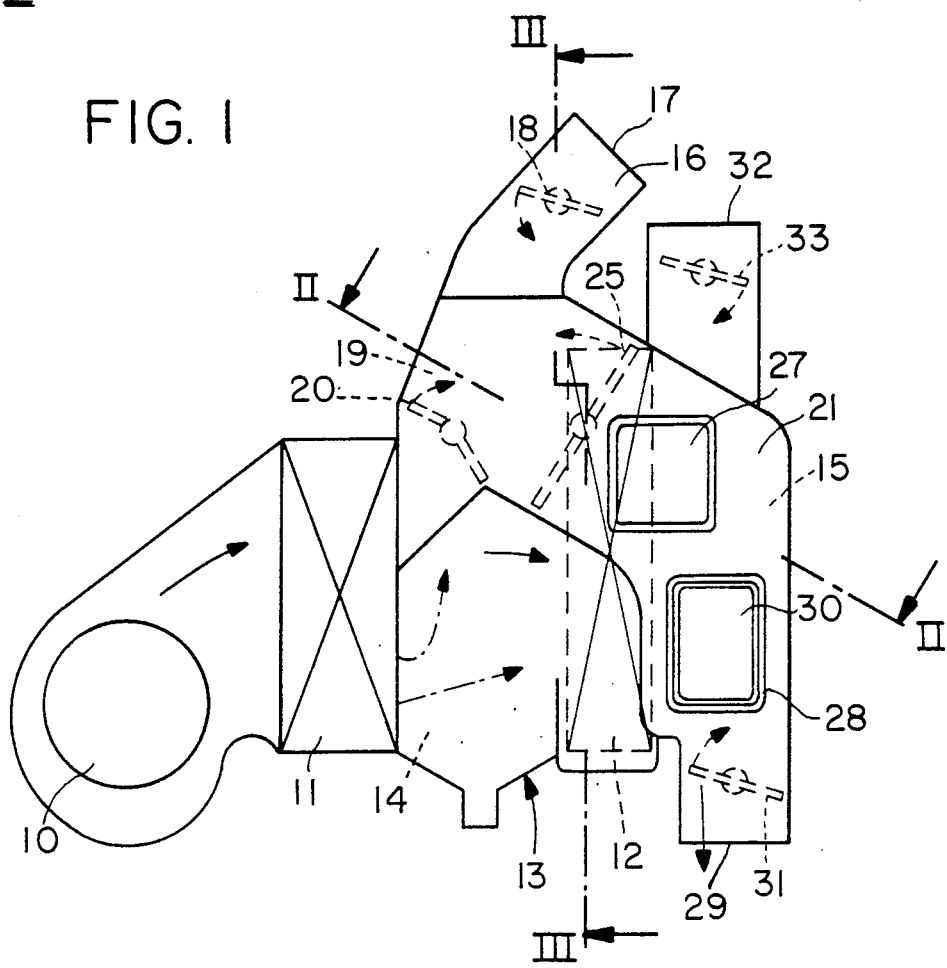
FIG. 1 is a schematic sectional side view of an air-conditioning system for a motor vehicle constructed according to preferred embodiments of the invention.

The air-conditioning system which can be seen in a diagrammatic representation and in side view in FIG. 1 has a blower 10, and evaporator 11 and a heat exchanger 12 which are arranged in the said sequence downstream of the blower flow. The heat exchanger 12 is arranged approximately centrally in an air distributor box 13 which is connected directly by means of its inlet cross-section to the evaporator 11. The heat exchanger 12 extends over the entire clear cross-section of the air distributor box 13 and subdivides this into a front space portion 14 facing the evaporator 11 and a rear space portion 15 located behind the heat exchanger 12, as seen from the evaporator 11. There extends from the front space portion 14, in the upper region of the air distributor box 13, and air-guide connection piece 16 which at its end carries an air-outflow port 17 for a middle nozzle, not shown in detail here, arranged in the dashboard of the vehicle. The air-outflow port 17 is equipped with an air shutoff flap 18, by means of which the air stream entering the passenger space via the air-outflow port 17 can be adjusted. The inflow port 19 of the air-guide connection piece 16 in the air distributor box 13, the inflow port extending over the entire width of the heat exchanger 12, is equipped with a cold-air scoop flap 20, by means of which the air stream entering the air-guide connection piece 16 from the space portion 14 can be cut in or cut off.

Figure 3:
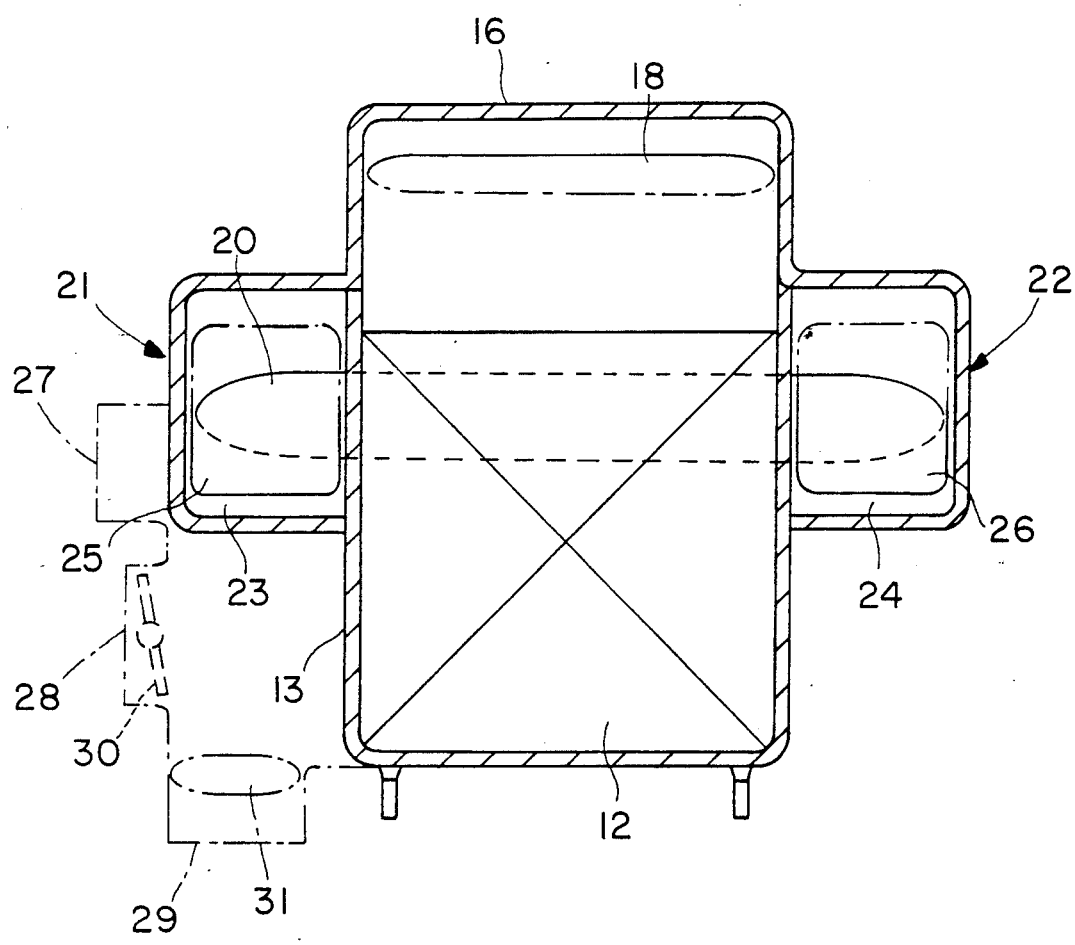
FIG. 3 shows a section along the line III—III in FIG. 1.

From the rear space portion 15 of the air distributor box 13 extend two bypass channels 21 and 22 (FIG. 3) which are guided laterally around the heat exchanger 12 at the air distributor box 13 and which terminate above the cold-air scoop flap 20 in the air-guide connection piece 16. Arranged at the transition orifices 23, 24 of the bypass channels 21, 22 into the air-guide connection piece 16 are temperature control flaps 25, 26 (FIG. 3), by means of which these can be opened or closed.

As is evident from FIG. 1 for the bypass channel 21, the bypass channels 21, 22 are attached laterally to the rear space portion 15 of the air distributor box 13, extending in this region over the entire vertical height of the rear space portion 15, and from here run with a reduced channel cross-section laterally along the air distributor box 13 as far as the air-guide connection piece 16. To illustrate this run of the bypass channels 21, 22, in the cross-sectional representation of FIG. 3 the otherwise invisible run of the bypass channel 21 in the region of the heat exchanger 12 of the rear space portion 15 is indicated by dot-and-dash lines. An air-outflow port 27 for a side nozzle is arranged in the channel portion of reduced cross-section of each of the bypass channels 21, 22. An air-outflow port 28 for a back nozzle and an air-outflow port 29 for a foot-space nozzle are provided in that region of each of the two bypass channels 21, 22 which laterally covers the rear space portion 15 of the air distributor box 13. The two air-outflow ports 28, 29 are each equipped with an air-shutoff flap 30, 31. Whilst the air-outflow port 28 in the bypass channels 21, 22 is arranged laterally, the air-outflow port 29 is located on that lower end face of the respective bypass channel 21, 22 directed towards the floors of the passenger space. In the air distributor box 13, an air-outflow port 32 for a deicer nozzle, likewise equipped with an air-shutoff flap 33, is provided in the rear space portion 15 in the upper limiting wall of the air distributor box 13.

Figure 2:
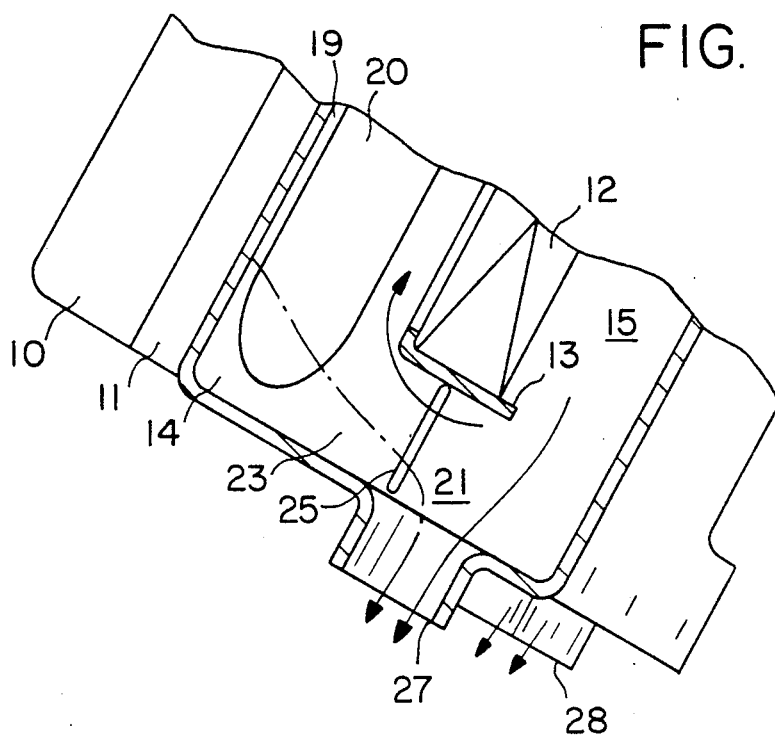
FIG. 2 shows a section along the line II—II in FIG. 1.

In FIGS. 1 and 2, the warm air path is symbolized by arrows represented by unbroken lines, the cold-air path in the normal operating mode by arrows represented by broken lines and the cold-air paths in the "maximum cooling" operating mode by arrows represented by dot-and-dash lines. In the warm air mode, the air conveyed by the blower 10 passes through the evaporator 11, enters the front space portion 14 of the air distributor box 13 and, with the cold-air scoop flap 20 closed, flows through the heat exchanger 12. The warm air consequently present in the rear space portion 15 of the air distributor box 13 flows back via the bypass channels 21, 22 and, on the one hand, passes out into the passenger space through air-outflow ports 27 for the side nozzles via the latter, and on the other hand, with the air flaps 25, 26 open, flows into the air-guide connection piece 16, in order likewise to flow into the passenger space via the air-outflow port 17 of the middle nozzle. If the air-shutoff flap 33 in the air-outflow port 32 of the deicer nozzle is likewise opened, here too warm air can flow out in the direction of the windscreen of the passenger space. If the air-shutoff flaps 30 and 31 at the air-outflow ports 28 and 29 for the back and foot-space nozzles are correspondingly opened, warm air can also be conveyed into these regions of the passenger space. When cooling is to take place in the normal operating mode, the cold-air scoop flap 20 must be opened, with the result that the cold air cooled in the evaporator 11 comes out of the front space portion 14 of the air distributor box 13 directly into the air-guide connection piece 16. The passenger space is now supplied with cold air via the middle nozzle.

In the "maximum cooling" mode, both the cold-air scoop flap 20 and the temperature control flaps 25, 26 in the bypass channels 21, 22 are opened completely, and this can be triggered, for example, by an appropriate control unit by means of control logics. In this instance, the cold air flow both through the air-guide connection piece 16 and, in the opposite direction to the warm air, through the bypass channels 21, 22, in order to enter the passenger space via the air-outflow ports 27 of the side nozzle. If required, the air shutoff flaps 30, 31 at the air-outflow ports 28, 29 of the back and foot-space nozzles can also be opened, in order to allow cold air to enter this region too. The cold air flowing in simultaneously at different points of the passenger space ensures a more rapid cooling of the passenger space than it would be possible to obtain simply via the middle nozzle in the normal "cooling" mode.

With the air-conditioning system switched off, the "maximum cooling" mode can be used for the rapid ventilation of the passenger space by the introduction of a high stream of fresh air via middle and side nozzles.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Air-conditioning system for vehicles comprising:
   an evaporator arranged downstream of the blower,
   a heat exchanger,
   and an air distributor box which has air-outflow ports for at least one middle nozzle, for side nozzles, and a for at least one foot-space, back and deicer nozzles, said air distributor box being connected directly by means of its inlet cross-section to the evaporator and receiving the heat exchanger approximately centrally in such a way that it is subdivided by the heat exchanger into a front space portion facing the evaporator and into a rear space portion located behind the heat exchanger,
   wherein an air-guide connection piece branches off from the front space portion of an upper region of the air distributor box as seen from the evaporator, said connection piece carries the air-flow port for the middle nozzle at its end, at least one inflow port located in the air distributor box and extending over the entire evaporator width is selectively closeable by means of a cold-air scoop flap, wherein the heat exchanger completely covers the cross-section of the air distributor box, wherein there extends from the rear space portion of the air distributor box two bypass channels which are guided laterally around the heat exchanger and which terminate in the air-guide connection piece, wherein the air outflow ports of the bypass channels are selectively closeable by means of temperature control flaps, and wherein the air-outflow ports for the side nozzles are arranged in the two bypass channels.

2. Air-conditioning system according to claim 1, wherein the bypass channels are attached laterally to the rear space portion of the air distributor box and extend in this region over the entire vertical height of the rear space portion and from here extend with a reduced channel cross-section laterally along the air distributor box as far as the air-guide connection piece.

3. Air-conditioning system according to claim 2, wherein the air-outflow ports for the side nozzles are arranged in those channel portions of the bypass channels having the reduced channel cross-section.

4. Air-conditioning system according to claim 2, wherein air-outflow ports is arranged in each of the two bypass channels for a back nozzle and for a foot-space nozzle, which air-outflow port can be closed by means of air-shutoff flaps.

5. Air-conditioning system according to claim 4, wherein the air-outflow ports for the back and foot-space nozzles are arranged in those regions of the bypass channels laterally covering the rear space portion of the air distributor box, the air-outflow port for the back nozzle being located laterally approximately at mid-height and the air-outflow port for the foot-space nozzle being located on the lower end face of the channel region.

6. Air-conditioning system according to claim 1, wherein the air-outflow port for the middle nozzle is assigned an air-shutoff flap.

7. Air-conditioning system according to claim 1, wherein the air-outflow ports for at least one deicer nozzle are arranged in the rear space portion of the air distributor box in it upper limiting wall.

8. Air-conditioning system according to claim 2, wherein the air-outflow port for the middle nozzle is assigned an air-shutoff flap.

9. Air-conditioning system according to claim 3, wherein the air-outflow port for the middle nozzle is assigned an air-shutoff flap.

10. Air conditioning system according to claim 4, wherein the air-outflow port for the middle nozzle is assigned an air-shutoff flap.

11. Air-conditioning system according to claim 2, wherein the air-outflow ports for at least one deicer nozzle are arranged in the rear space portion of the air distributor box in it upper limiting wall.

12. Air-conditioning system according to claim 3, wherein the air-outflow ports for at least one deicer nozzle are arranged in the rear space portion of the air distributor box in it upper limiting wall.

13. Air-conditioning system according to claim 4, wherein the air-outflow ports for at least one deicer nozzle are arranged in the rear space portion of the air distributor box in it upper limiting wall.

14. Air-conditioning system according to claim 5, wherein the air-outflow ports for at least one deicer nozzle are arranged in the rear space portion of the air distributor box in it upper limiting wall.

15. Air-conditioning system according to claim 14, wherein the air-outflow port for the middle nozzle is assigned an air-shutoff flap.

* * * * *